(12) United States Patent
Truckor

(10) Patent No.: US 8,783,633 B2
(45) Date of Patent: *Jul. 22, 2014

(54) SHELF BRACKET FOR A TELEVISION WALL MOUNT

(71) Applicant: Jeffrey A. Truckor, Toledo, OH (US)

(72) Inventor: Jeffrey A. Truckor, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/768,429

(22) Filed: Feb. 15, 2013

(65) Prior Publication Data

US 2013/0153726 A1 Jun. 20, 2013

Related U.S. Application Data

(63) Continuation of application No. 13/025,328, filed on Feb. 11, 2011, now Pat. No. 8,628,050.

(60) Provisional application No. 61/303,922, filed on Feb. 12, 2010, provisional application No. 61/375,949, filed on Aug. 23, 2010.

(51) Int. Cl.
*A47B 96/00* (2006.01)

(52) U.S. Cl.
USPC .................. 248/205.1; 248/295.11; 248/917; 182/82

(58) Field of Classification Search
USPC ............ 248/205.1, 221.11, 220.22, 235, 241, 248/295.11, 297.21, 297.51, 917, 345.1, 248/225.21, 225.11; 348/836; 182/82, 150
See application file for complete search history.

(56) References Cited

U.S. PATENT DOCUMENTS

| | | | |
|---|---|---|---|
| 4,949,924 | A | 8/1990 | Carmody |
| 5,639,060 | A | 6/1997 | Spoonts et al. |
| 5,810,314 | A | 9/1998 | Raziano |
| 6,053,280 | A | 4/2000 | Smith et al. |
| 6,886,662 | B2 | 5/2005 | Riley |
| 7,044,423 | B2 | 5/2006 | Bober et al. |
| 8,196,705 | B2 | 6/2012 | Jejina |
| 2004/0045224 | A1 | 3/2004 | Chesser et al. |
| 2005/0199441 | A1 | 9/2005 | Thery |
| 2005/0258321 | A1 | 11/2005 | Worrall et al. |
| 2006/0060738 | A1 | 3/2006 | Whittington et al. |
| 2006/0214072 | A1 | 9/2006 | Lee |
| 2007/0056799 | A1 | 3/2007 | Leidner |
| 2007/0277449 | A1 | 12/2007 | Burns |
| 2009/0039212 | A1 | 2/2009 | Whalen et al. |
| 2009/0045015 | A1 | 2/2009 | Anstead et al. |

FOREIGN PATENT DOCUMENTS

| | | |
|---|---|---|
| JP | 2006287562 A | 10/2006 |
| JP | 2009097279 A | 5/2009 |

*Primary Examiner* — Anita M King
(74) *Attorney, Agent, or Firm* — Fraser Clemens Martin & Miller LLC; William J. Clemens

(57) ABSTRACT

A shelf bracket for a wall mount includes a connecting member including a main body secured to the wall mount and a support member coupled to the connecting member, the support member including a generally "L" shaped main body to support a shelf, wherein at least one of the connecting member and the support member has a generally "U" shape cross section with an open side.

18 Claims, 7 Drawing Sheets

SHELF BRACKET FOR A TELEVISION WALL MOUNT

CROSS REFERENCE TO RELATED APPLICATIONS

This application is a continuation of U.S. patent application Ser. No. 13/025,328 filed on Feb. 11, 2011, which in turn claims the benefit of U.S. Provisional Application No. 61/303,922 filed Feb. 12, 2010 and U.S. Provisional Patent Application No. 61/375,949 filed Aug. 23, 2010. The entire disclosures of the above applications are hereby incorporated herein by reference.

FIELD OF THE INVENTION

The present invention generally relates to brackets. In particular, the invention is directed to a shelf bracket for a wall mount for a flat screen television.

BACKGROUND OF THE INVENTION

Consumers are obtaining ever more audio/video components or equipment for use with their televisions. The audio/video components for a flat-panel television, such as a digital video player, are typically located in close proximity to the television. Once a flat-panel television is mounted to a wall, there is a need for a shelf unit that will support the associated electronics and audio/video components.

The prior art describes shelf units that fasten to walls. However, due to the weight of electronic components, the shelf units should be securely fastened to vertical wall studs in order to ensure maximal strength and resistance to sag and failure. Since vertical wall studs are not typically located at locations that allow for optimal visual placement of the wall shelf units, prior art has limited the locations at which a shelf unit with high load-bearing capacity can be placed.

It would be desirable to develop a shelf bracket which can be used in conjunction with flat screen televisions and associated wall mounts to enable consumers to place the audio/video components in close proximity to the television without the need to invest in expensive cabinetry.

SUMMARY OF THE INVENTION

In concordance with the instant disclosure, a shelf bracket which can be used in conjunction with flat screen televisions and associated wall mounts to enable consumers to place the audio/video components in close proximity to the television without the need to invest in expensive cabinetry, has surprisingly been discovered.

The invention is directed to a shelf bracket for a television wall mount. The bracket is coupled to a wall mount for a flat screen television (e.g. http://www.levelmount.com/c-8-large-lcdplasma-mounts.aspx) to support a shelf thereon.

In one embodiment, a shelf bracket for a wall mount comprises: a connecting member including a main body secured to the wall mount; and a support member coupled to the connecting member, the support member including a generally "L" shaped main body to support a shelf, wherein at least one of the connecting member and the support member has a generally "U" shape cross section with an open side.

In another embodiment, a shelf bracket for a wall mount comprises: a connecting member including a main body having a slit formed therein, wherein the slit is sized to receive a portion of the wall mount to releasably secure the connecting member thereto; an extension member coupled to the connecting member, the extension member including a main body having an anti-lift tab protruding therefrom, wherein at least one of the main body and the anti-lift tab is disposed adjacent a portion of the wall mount; and a support member coupled to the extension member, the support member including a generally "L" shaped main body to support a shelf.

In yet another embodiment, a shelf bracket for a wall mount comprises: a connecting member including a main body having a slit formed therein, wherein the slit is sized to receive a portion of the wall mount to releasably secure the connecting member thereto; an extension member coupled to the connecting member in one of a plurality of configurations, an anti-lift device coupled to at least one of the extension member and the connecting member, a portion of the anti-lift device abutting the wall mount to limit a movement of the at least one of the extension member and the connecting member relative to the wall mount; and a support member coupled to the extension member, the support member including a generally "L" shaped main body to support a shelf.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1, 2A-2B, and 3 illustrate a shelf bracket 10 mounted to a conventional wall mount 12 for a flat screen television according to an embodiment of the present invention. As shown, the shelf bracket 10 includes a pair of support arms 14 formed from three sided metal material and having a generally "U"-shaped cross section. As a non-limiting example, the "U" shaped cross section provides a space for managing electrical and communication cords and wires. In the embodiment shown, a cover 15 can be coupled to an open side of the "U" shaped cross section of each of the support arms 14 to enclose the cords and wires therein. It is understood that the support arms 14 can be formed from any rigid material. It is further understood that the support arms 14 can have any size, shape, and cross section as desired.

Figure 3:
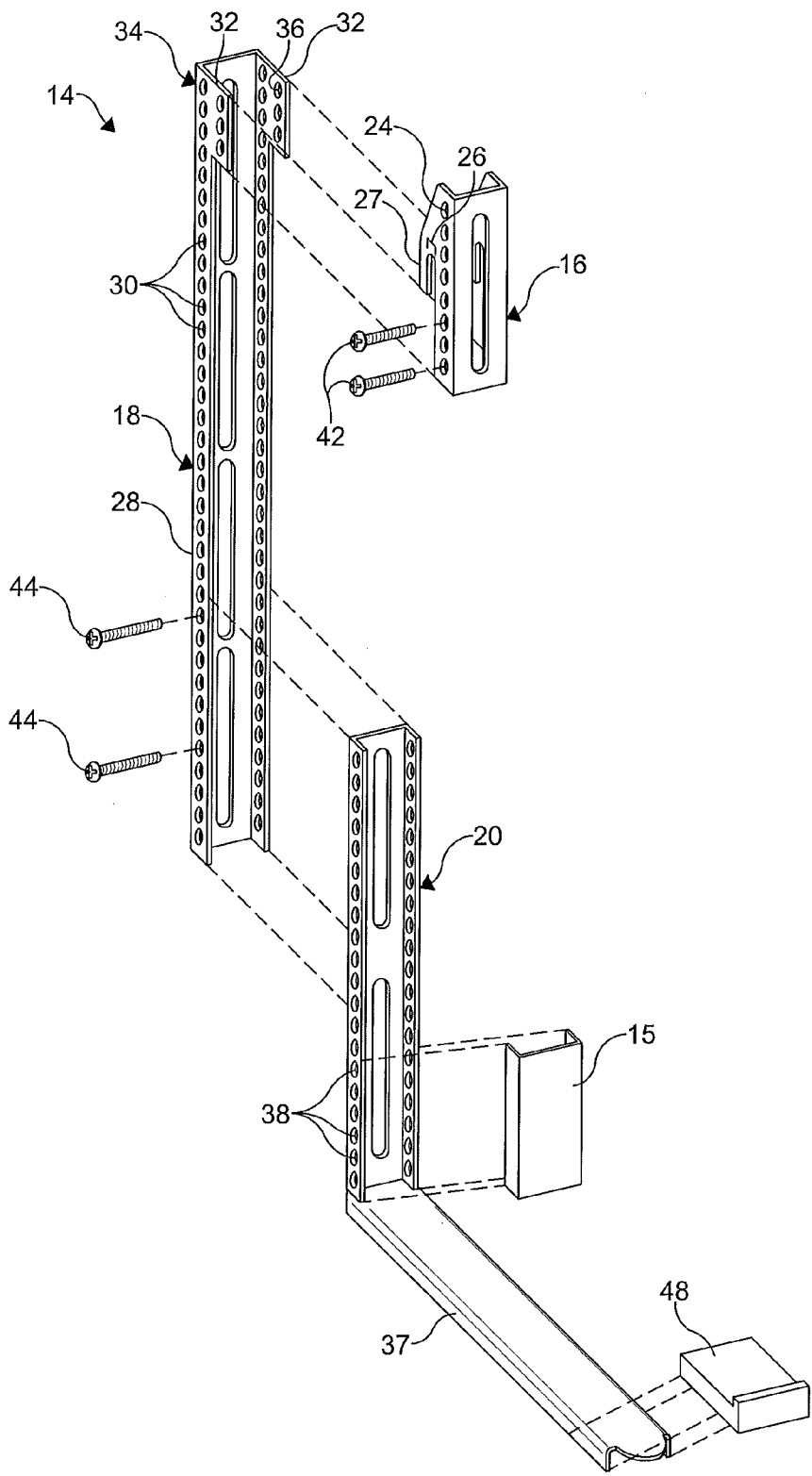
FIG. 3 is an exploded perspective view of a support arm of the shelf bracket of FIG. 1, the support arm shown in the first configuration.

As more clearly shown in FIG. 3, each of the support arms 14 includes a connecting member 16, a universal extension member 18, and an adjustable shelf support member 20. It is understood that the support arms 14 can be formed as a unitary member. It is further understood that any of the connecting member 16, the extension member 18, and the support member 20 can be formed together, permanently coupled to each other, or releasably coupled to each other.

The connecting member 16 includes a main body 22 having a plurality of apertures 24 formed therein. In the embodiment shown, the apertures 24 are aligned in a linear configuration. A slit 26 is formed in a portion of the main body 22 adjacent a support tab 27, wherein the slit 26 is sized to receive a portion of the wall mount 12 to releasably secure the connecting member 16 to the wall mount 12. However, it is understood that the connecting member 16 can be permanently coupled to the wall mount 12 or formed integrally therewith.

The extension member 18 includes a main body 28 having a generally "U" shaped cross section with an interior length of an open end of the "U" shaped cross section sized to receive at least a portion of the connecting member 16 and the shelf support member 20 therein. A plurality of apertures 30 are formed in the main body 28 and configured in a linear pattern to align with the apertures 24 of the connecting member 16, during installation. An anti-lift tab 32 protrudes from the main body 28 adjacent an upper end 34 thereof. The anti-lift tab 32 includes a plurality of apertures 36 aligned in a linear configuration.

The support member 20 includes a generally "L" shaped main body 37 having a generally "U" shaped cross section. A plurality of apertures 38 are formed in the main body 37 and arranged in a linear pattern to align with the apertures 30 of the extension member 18, during installation. In certain embodiments, the connecting member 16 and the extension member 18 are formed as a unitary piece, to which the support member 20 is coupled.

In use, each of the connecting members 16 is coupled to the wall mount 12 by guiding an upper lip 40 of the wall mount 12 into the slit 26 of each of the connecting members 16. Each of the extension members 18 is disposed around a portion of a respective one of the connecting members 16 to receive at least a portion of the connecting member 16 in the "U" of the main body 28.

Figure 1:
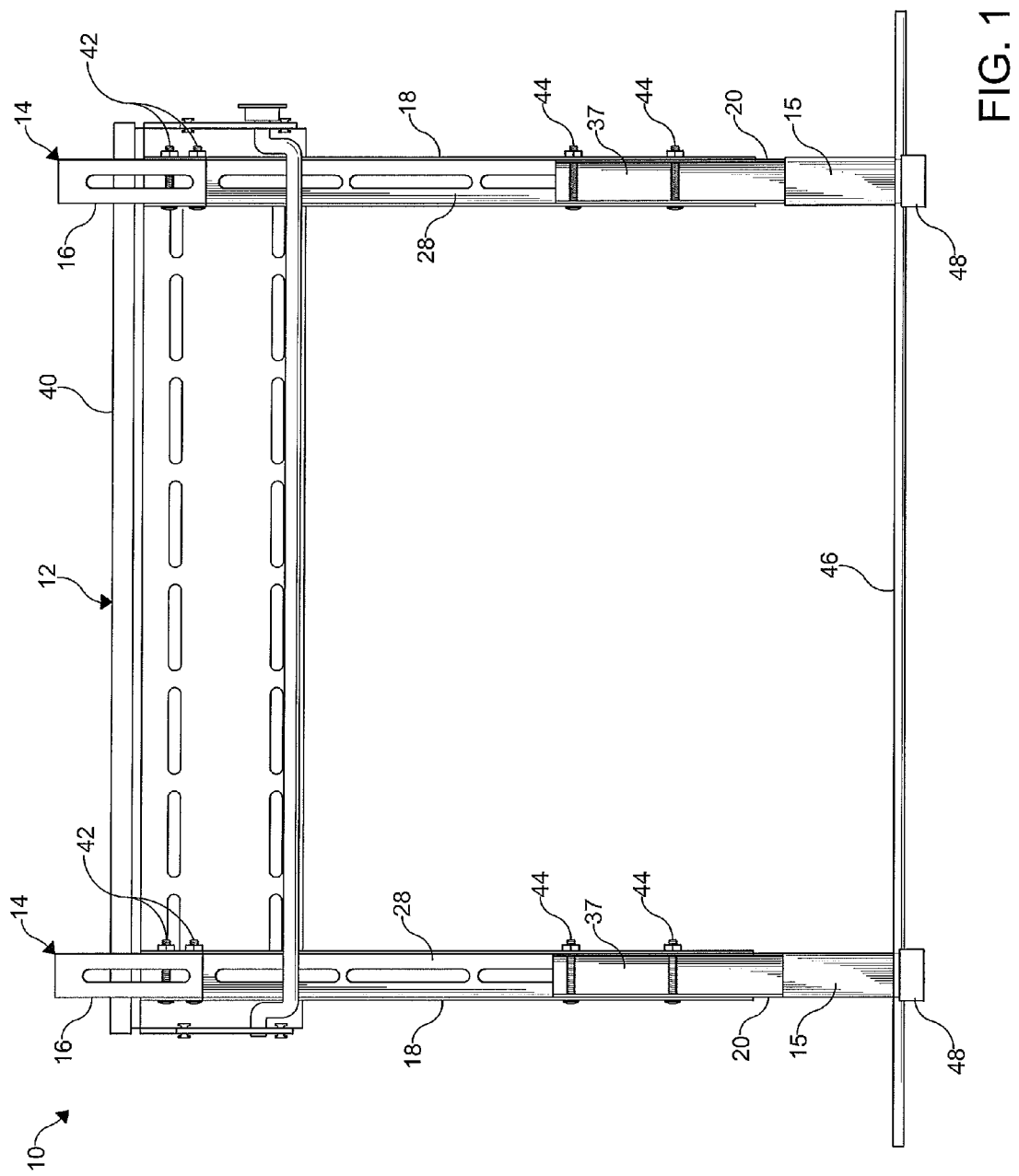
FIG. 1 is a front elevational view of a shelf bracket coupled to a wall mount for a flat screen television according to an embodiment of the present invention.
Figure 2A:
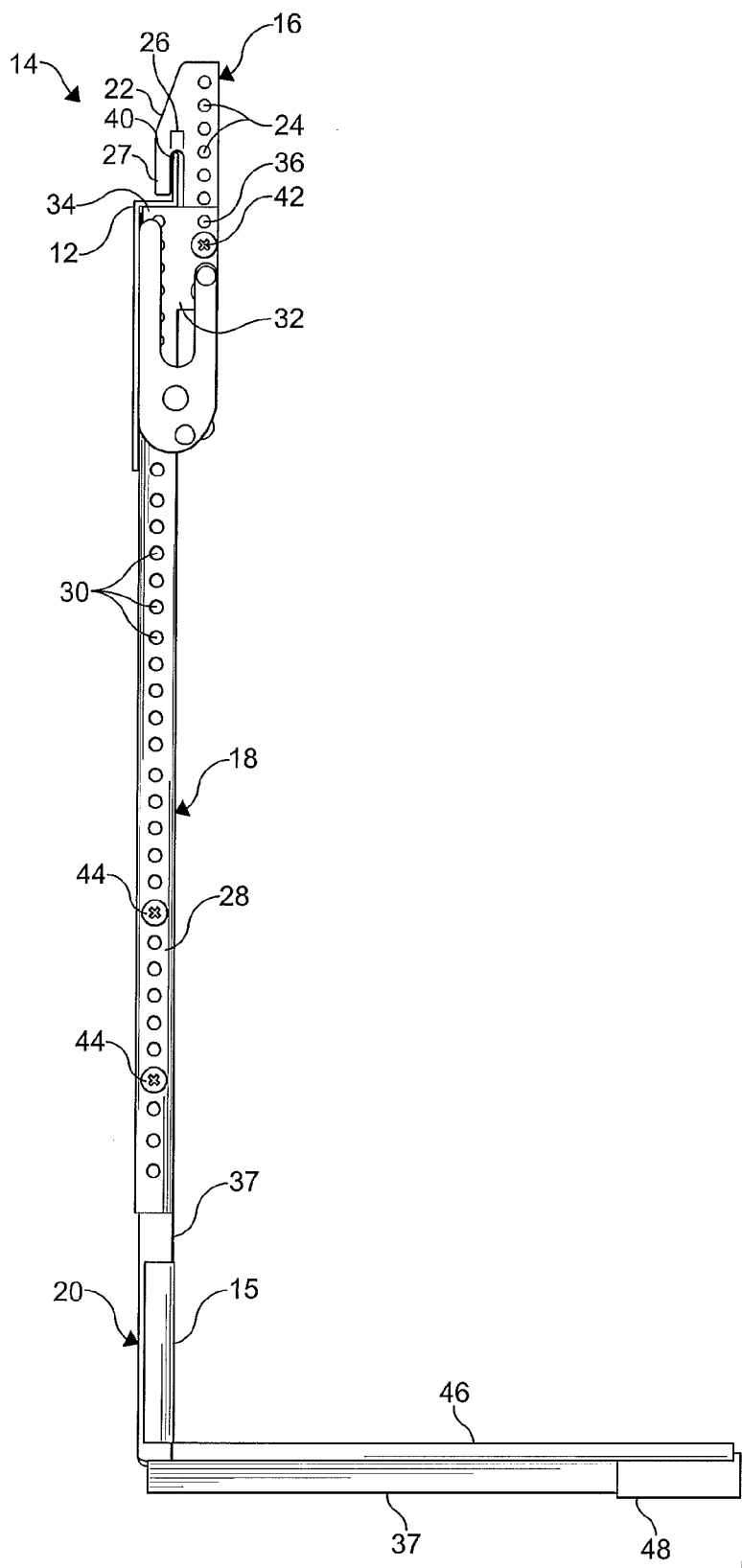
FIG. 2A is a side elevational view of the shelf bracket of FIG. 1 shown in a first configuration.

In certain embodiments, the main body 28 of each of the extension members 18 is disposed adjacent the wall mount 12 and the anti-lift tab 32 extends away from wall mount 12, as shown in FIG. 2A. As such, a fastener (e.g. bolt) 42 is disposed through the apertures 36 of each of the tabs 32 and the apertures 24 of the connecting members 16 to secure each of the extension members 18 to the respective connecting member 16. As a non-limiting example, the arrangement illustrated in FIG. 2A is suitable for a wall mount having only the upper lip 40 and no other ridges, protrusions, or structure that would inhibit each of the extension members 18 from resting substantially parallel to a wall on which the wall mount is disposed.

Figure 2B:
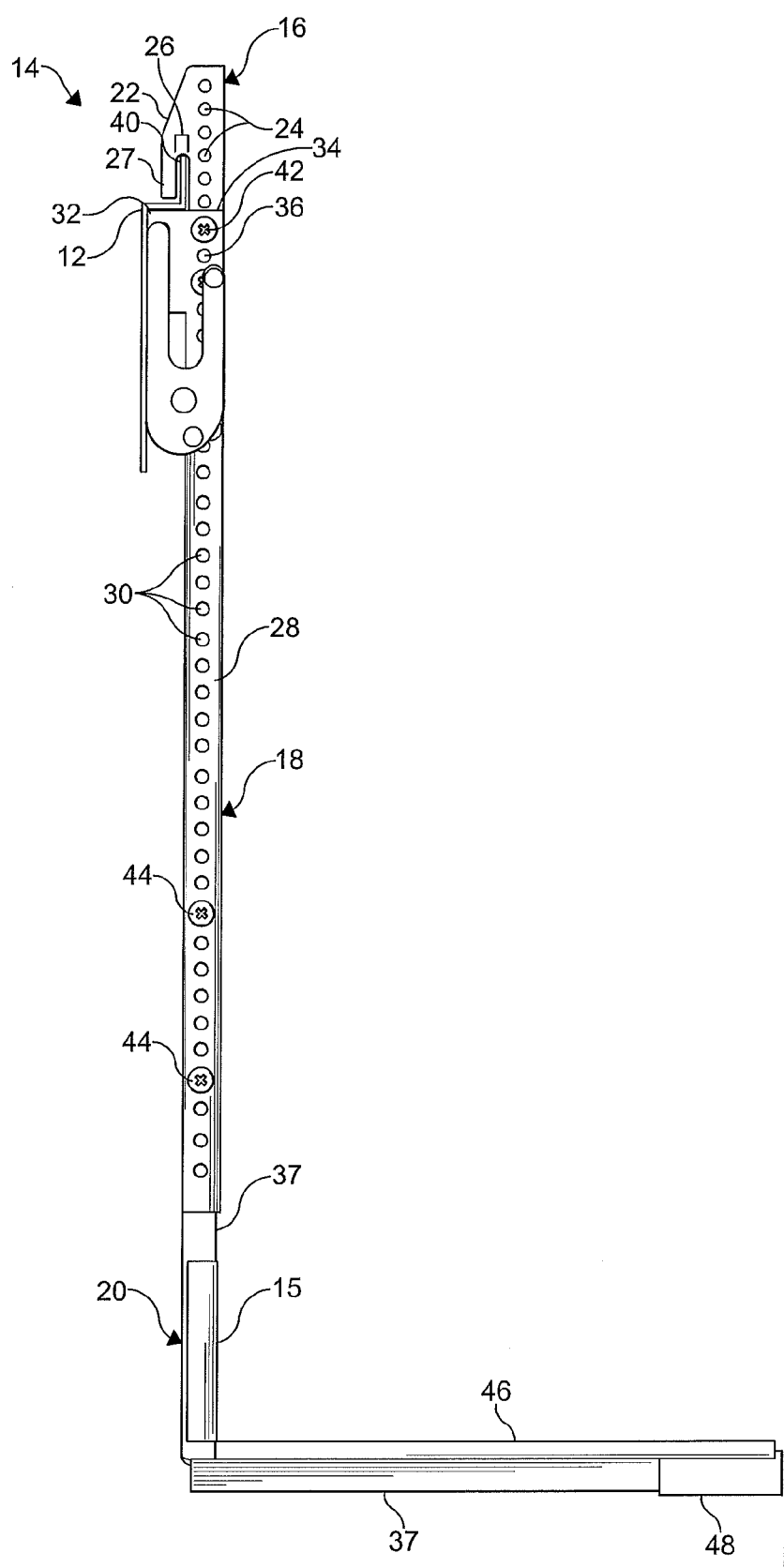
FIG. 2B is a side elevational view of the shelf bracket of FIG. 1 shown in a second configuration.

In certain embodiments, the main body 28 of each of the extension members 18 is spaced from the wall mount 12 and the anti-lift tab 32 abuts a portion of the wall mount 12, as shown in FIG. 2B. As such, the fastener 42 is disposed through the apertures 30 of the extension members 18 and the apertures 24 of the connecting members 16 to secure each of the extension members 18 to the respective connecting member 16. As a non-limiting example, the arrangement illustrated in FIG. 2B provides an anti-lift feature for wall mounts having a lower lip (not shown) or other structure that would otherwise inhibit the extension members 18 from resting substantially parallel to the wall on which the wall mount is disposed.

Once each of the extension members 18 is coupled to the respective connecting members 16, each of the support members 20 is coupled to a respective one of the extension members 18. Specifically, the main body 37 of each of the support members 20 is received in the "U" of the main body 28 of the respective extension member 18, such that at least a portion of the apertures 30 of the extension member 18 is aligned with at least a portion of the apertures 38 of the support member 20. A plurality of fasteners 44 are disposed through the apertures 30, 38 to secure the support members 20 to the respective extension member 18.

A shelf 46 is disposed on a horizontal portion of the support members 20. As a non-limiting example, the shelf 46 is formed from a tempered glass. However, it is understood that any material can be used. It is further understood that the shelf 46 can have any size and shape, as desired. In certain embodiments, a height of the shelf 46 from a floor surface is adjusted by configuring a relative position between the support members 20 and the extension members 18. It is understood that an arrangement of the apertures 30, 38 provides various options for configuring a position of the shelf 46. It is understood that each of the support members 20 can be coupled to one of the extension members 18 or directly/indirectly to one of the connecting members 16 in one of a plurality of configurations. It is further understood that each of the configurations can position the shelf 46 a pre-determined distance from the wall mount 12.

In certain embodiments, a pair of plastic end caps 48 are disposed in an open end of each of the shelf support members 20. As a non-limiting example, the caps 48 protrude above the height of the open ends and include a slot to receive a front end of the shelf to provide additional support to the shelf 46.

Figure 4:
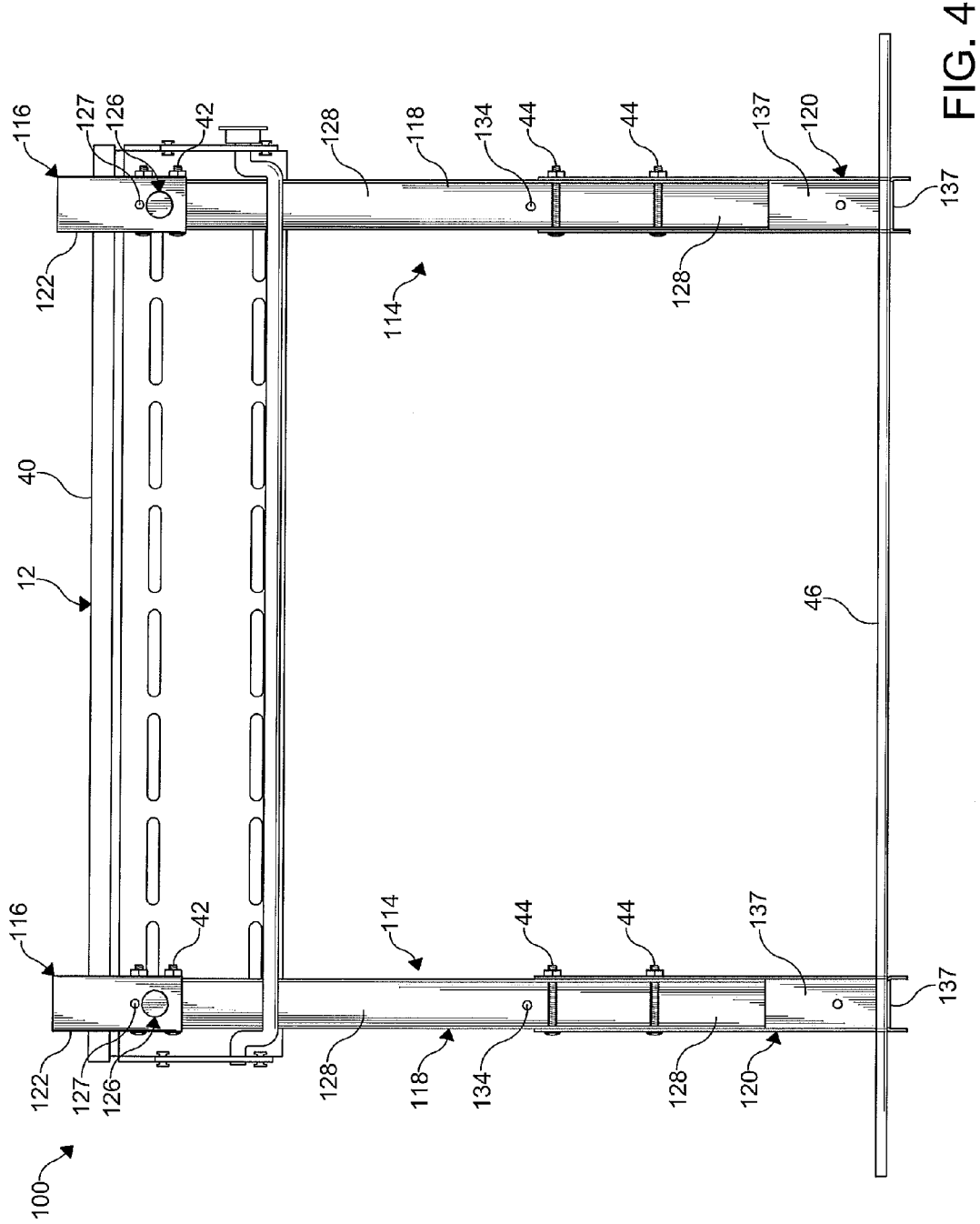
FIG. 4 is a front elevational view of a shelf bracket coupled to a wall mount for a flat screen television according to another embodiment of the present invention.
Figure 5:
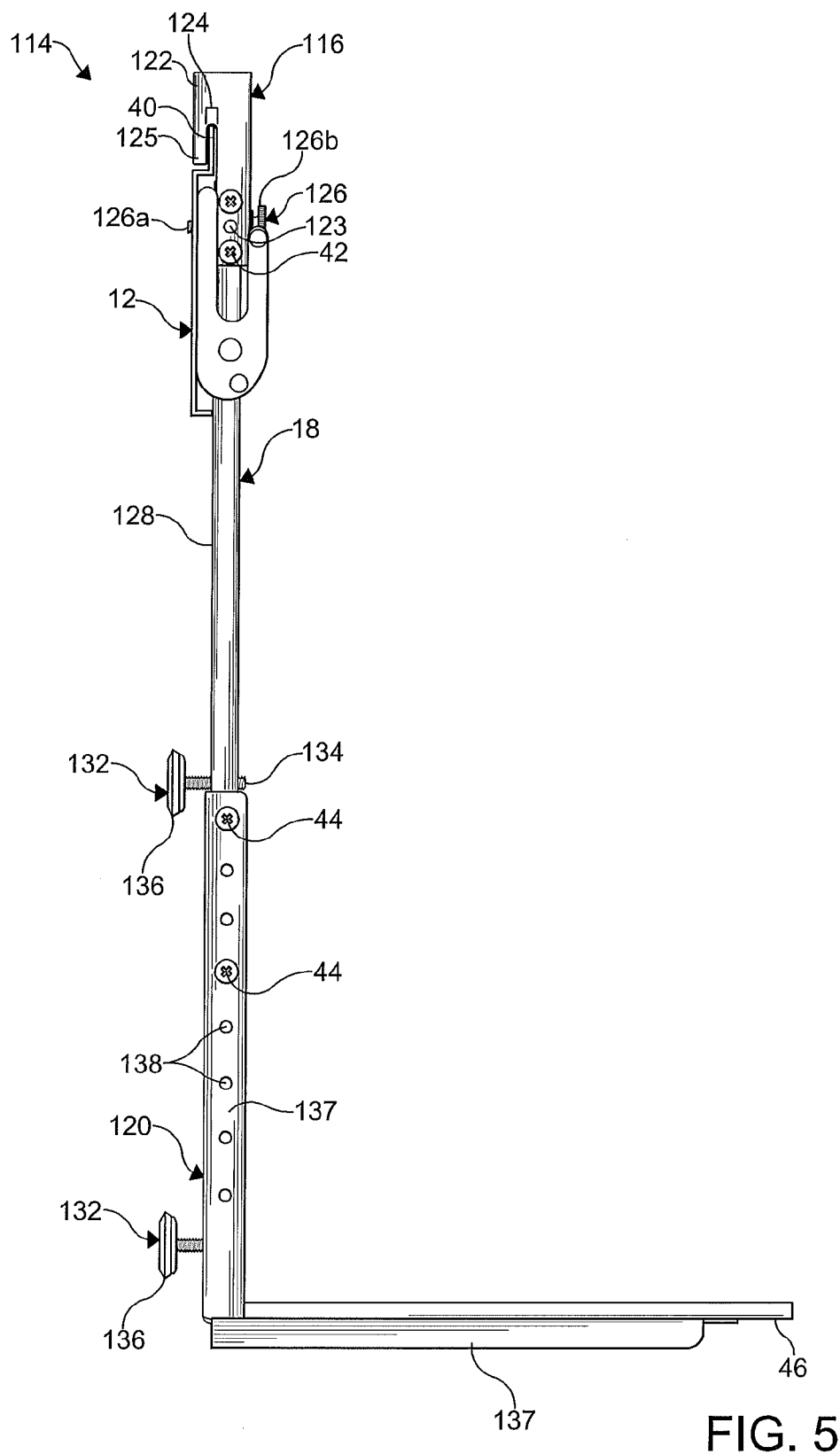
FIG. 5 is a side elevational view of the shelf bracket of FIG. 4.
Figure 6:
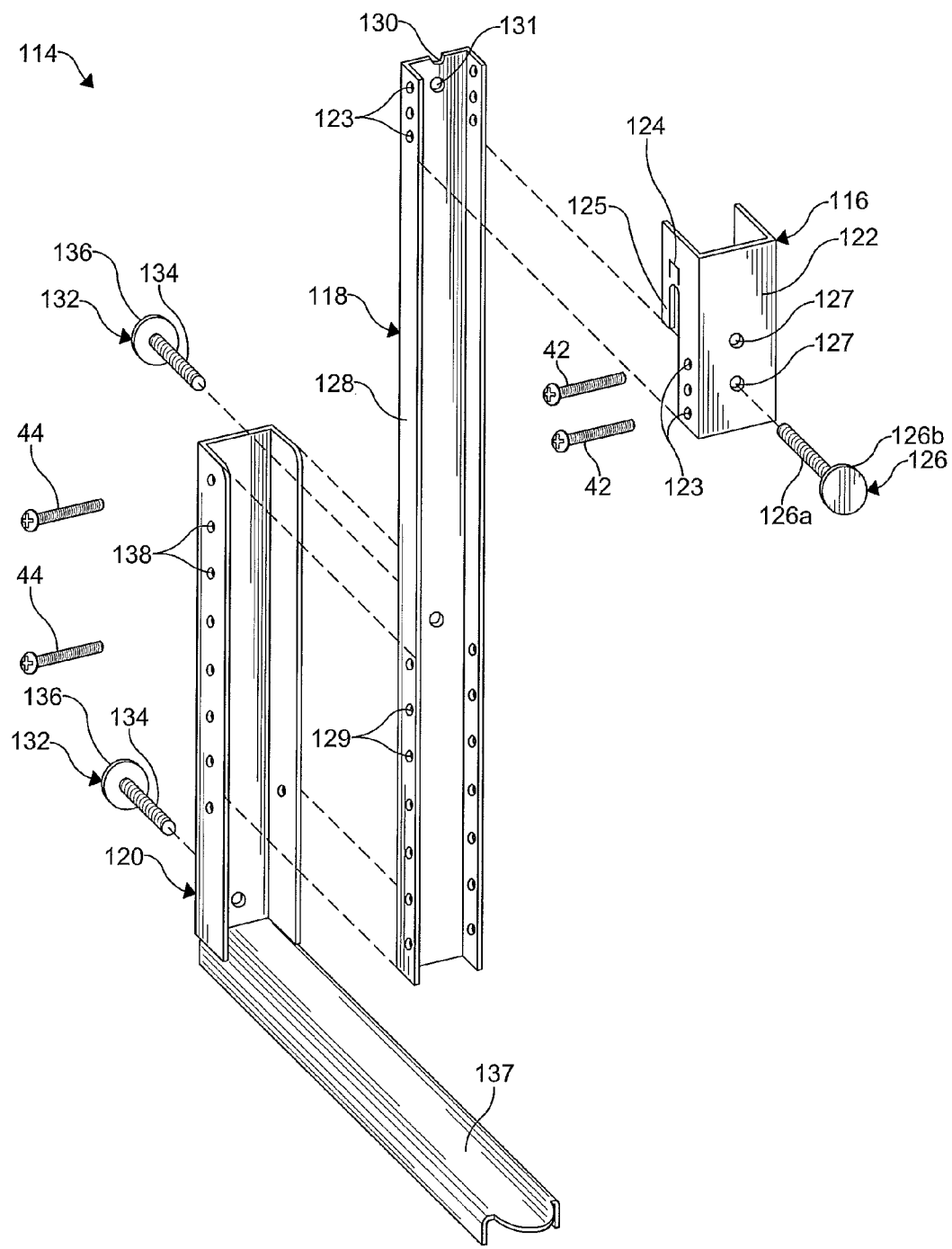
FIG. 6 is an exploded perspective view of a support arm of the shelf bracket of FIG. 4.

FIGS. 4-6 illustrate a support arm 114 for a shelf bracket 100 according to another embodiment of the present invention similar to the support arm 14, except as described herein below. As shown, the support arm 114 includes a connecting member 116, a universal extension member 118, and an adjustable shelf support member 120. It is understood that the connecting member 116 and the extension member 118 can be formed independently or as a unitary member.

The connecting member 116 includes a main body 122 having a generally "U" shaped cross section with an interior length of an open end of the "U" shaped cross section sized to receive at least a portion of the extension member 118 therein. The main body 122 includes a plurality of apertures 123 formed therein. In the embodiment shown, the apertures 123 are aligned in a linear configuration. A slit 124 is formed in a portion of the main body 122 adjacent a support tab 125, wherein the slit 124 is sized to receive a portion of the wall mount 12 to releasably secure the connecting member 116 to the wall mount 12.

As a non-limiting example, an anti-lift device 126 including an elongate portion 126a and a head portion 126b is selectively received through one of a plurality of apertures 127 formed in the main body 122. As a further non-limiting example, the elongate portion 126a threadably engages one of the apertures 127, while the head portion 126b is configured to allow a user to rotate the anti-lift device 126. It is understood that other means of securing the anti-lift device 126 to the main body 122 can be used.

The extension member 118 includes a main body 128 having a generally "U" shaped cross section with an exterior length of the "U" shaped cross section sized to be received in the open end of the "U" of the connecting member 116 and the shelf support member 120. A plurality of apertures 129 are formed in the main body 128 and configured in a linear pattern to align with the apertures 123 of the connecting member 116, during installation. In certain embodiments, an end of the main body 128 includes a semi-circular notch 130 spaced from and aligned with an aperture 131 formed in the main body 128. At least one of the notch 130 and the aperture 131 are configured to align with one of the apertures 127 during installation to receive the anti-lift device 126.

A wall bumper 132 having an elongate threaded portion 134 and a bumper element 136 is coupled to the main body 128 of the extension member 118. As a non-limiting example, the threaded portion 134 threadably engages an aperture 135 formed in the main body 128 of the extension member 118. It is understood that any means of coupling the wall bumper to the extension member 118 can be used. It is further understood that other devices can be used to provide a protective spacer between the extension member 118 and a wall.

The shelf support member 120 includes a generally "L" shaped main body 137, wherein at least a portion of the main body 137 has a generally "U" shaped cross section with an interior length of an open end of the "U" shaped cross section sized to receive at least a portion of the extension member 118 therein. A plurality of apertures 138 are formed in the main body 137 and arranged in a linear pattern to align with the apertures 129 of the extension member 118, during installation. In the embodiment shown, the shelf support member 120 includes one of the wall bumpers 132 coupled to the main body 137 thereof.

In use, each of a pair of the connecting members 116 is coupled to the wall mount 12 by guiding an upper lip 40 of the wall mount 12 into the slit 126 of each of the connecting members 116. Each of the extension members 118 is disposed adjacent a portion of a respective one of the connecting members 116, wherein the open end of the "U" of the main body 122 receives at least a portion of the main body 128 of the extension member 118. It is understood the main body 128 can have any orientation relative to the connecting member 116 as long as at least one of the apertures 123 is aligned with one of the apertures 129.

In certain embodiments, the elongate portion 126a of the anti-lift device 126 is disposed through the aperture 127 and at least one of the notch 130 and the aperture 131. A portion of the elongate portion 126a of the anti-lift device 126 abuts a portion of the wall mount 12 in order to militate against an upward, lifting movement of the support arm 114 relative to the wall mount 12, once the support arm 114 is installed.

The fastener 42 is disposed through the apertures 129 of the extension members 118 and the apertures 123 of the connecting members 116 to secure each of the extension members 118 to the respective connecting member 116.

Once each of the extension members 118 is coupled to the respective connecting members 116, each of the shelf support members 120 is coupled to a respective one of the extension members 118. Specifically, a portion of the main body 137 of each of the support members 120 receives in a portion of the respective extension member 118, such that at least a portion of the apertures 129 of the extension member 118 is aligned with at least a portion of the apertures 138 of the shelf support member 120. A plurality of fasteners 44 are disposed through the apertures 129, 138 to secure the support members 120 to the respective extension member 118.

In certain embodiments at least one of the wall bumpers 132 is coupled to at least one of the extension member 118 and the shelf support member 120 of each of a pair of the support arms 114 such that the bumper element abuts a wall. It is understood that the wall bumpers 132 provide additional stability to the shelf bracket 10, while protecting the wall.

The shelf bracket 10 including a pair of the support arms 14, 114 is adapted to be coupled with any number of conventional wall mounts made by various manufacturers for any size televisions.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A shelf bracket for a wall mount comprising:
a connecting member including a main body secured to the wall mount, wherein the main body of the connecting member includes an elongate slit formed therein, the elongate slit sized to receive an upper lip portion of the wall mount to releasably secure the connecting member thereto, and wherein the upper lip portion of the wall mount is in the form of a sheet spaced apart from a wall mounting portion of the wall mount; and
a support member coupled to the connecting member, the support member including a generally "L" shaped main body to support a shelf,
wherein at least one of the connecting member and the support member has a generally "U" shape cross section with an open side.

2. The shelf bracket according to claim 1, wherein the support member is coupled to the connecting member in one of a plurality of configurations.

3. The shelf bracket according to claim 2, wherein each of the configurations positions the shelf a pre-determined distance from the wall mount.

4. The shelf bracket according to claim 1, wherein the main body of the connecting member has a "U" shaped cross section and at least a portion of the support member is received in the opening of the "U" shaped cross section.

5. The shelf bracket according to claim 1, further comprising a cover to enclose at least a portion of the open side of the support member.

6. The shelf bracket according to claim 1, wherein each of the connecting member and the support member has the generally "U" shape cross section with the open side.

7. The shelf bracket according to claim 6, wherein the open side of the connecting member faces in a direction opposite the open side of the support member.

8. A shelf bracket for a wall mount comprising:
a connecting member including a main body having a slit formed therein, wherein the slit is sized to receive a portion of the wall mount to releasably secure the connecting member thereto;
an extension member coupled to the connecting member, the extension member including a main body having an anti-lift tab protruding therefrom, wherein at least one of the main body and the anti-lift tab is disposed adjacent a portion of the wall mount; and
a support member coupled to the extension member, the support member including a generally "L" shaped main body to support a shelf
wherein each of the connecting member and the support member has a generally "U" shape cross section with an open side.

9. The shelf bracket according to claim 8, wherein the extension member is coupled to the connecting member in one of a plurality of configurations, wherein each of the configurations positions the shelf a pre-determined distance from the wall mount.

10. The shelf bracket according to claim 8, wherein the support member is coupled to the extension member in one of a plurality of configurations, wherein each of the configurations positions the shelf a pre-determined distance from the wall mount.

11. The shelf bracket according to claim 8, further comprising a wall bumper coupled to at least one of the extension member and the support member, a portion of the wall bumper disposed between the shelf bracket and a wall to which the wall mount is secured.

12. The shelf bracket according to claim 8, wherein the open side of the connecting member faces in a direction opposite the open side of the support member.

13. A shelf bracket for a wall mount comprising:
a connecting member including a main body having a slit formed therein, wherein the slit is sized to receive a portion of the wall mount to releasably secure the connecting member thereto;
an extension member coupled to the connecting member in one of a plurality of configurations, an anti-lift device coupled to at least one of the extension member and the connecting member, a portion of the anti-lift device abutting the wall mount to limit a movement of the at least one of the extension member and the connecting member relative to the wall mount; and
a support member coupled to the extension member, the support member including a generally "L" shaped main body to support a shelf,
wherein each of the connecting member and the support member has a generally "U" shape cross section with an open side.

14. The shelf bracket according to claim 13, wherein the extension member is coupled to the connecting member in one of a plurality of configurations, wherein each of the configurations positions the shelf a pre-determined distance from the wall mount.

15. The shelf bracket according to claim 13, wherein the support member is coupled to the extension member in one of a plurality of configurations, wherein each of the configurations positions the shelf a pre-determined distance from the wall mount.

16. The shelf bracket according to claim 13, wherein main body of the connecting member includes an aperture and the extension member includes at least one of an aperture and a notch substantially aligned with the aperture formed in the main body of the connecting member, the anti-lift device extending through each of the aperture formed in the main body of the connecting device and the at least one of an aperture and a notch formed in the extension member.

17. The shelf bracket according to claim 13, wherein the anti-lift device includes an elongate portion coupled to a head portion.

18. The shelf bracket according to claim 13, further comprising a wall bumper coupled to at least one of the extension member and the support member, a portion of the wall bumper disposed between the shelf bracket and a wall to which the wall mount is secured.

* * * * *